(12) United States Patent
Park et al.

(10) Patent No.: US 7,173,946 B2
(45) Date of Patent: Feb. 6, 2007

(54) MULTIMEDIA MULTIPLEXING METHOD

(75) Inventors: Dong-seek Park, Daegu (KR); John Villasenor, Los Angeles, CA (US)

(73) Assignees: Samsung Electronics Co., Ltd., Suwon (KR); The Regents of the University of California, Oakland, CA (US)

( * ) Notice: Subject to any disclaimer, the term of this patent is extended or adjusted under 35 U.S.C. 154(b) by 1136 days.

(21) Appl. No.: 09/887,332

(22) Filed: Jun. 25, 2001

(65) Prior Publication Data
US 2001/0038650 A1 Nov. 8, 2001

Related U.S. Application Data

(63) Continuation of application No. 08/884,630, filed on Jun. 27, 1997.

(51) Int. Cl.
*H04J 3/16* (2006.01)
*H04L 12/56* (2006.01)

(52) U.S. Cl. .................... 370/535; 370/509
(58) Field of Classification Search ........... 370/535, 370/537, 532, 472, 468, 476, 539, 474, 536, 370/470, 471, 538, 473, 509, 228, 238, 236
See application file for complete search history.

(56) References Cited

U.S. PATENT DOCUMENTS

| 4,330,858 | A | 5/1982 | Choquet | 370/528 |
| 4,495,595 | A | 1/1985 | Nakayashiki | 714/49 |
| 4,542,498 | A | 9/1985 | Bodros | 370/352 |
| 4,622,550 | A | 11/1986 | O'Connor | 370/452 |
| 5,229,992 | A | 7/1993 | Jurkevich | 370/471 |
| 5,345,474 | A * | 9/1994 | Hoshikawa | 375/219 |
| 5,361,260 | A | 11/1994 | Mito | 370/452 |
| RE35,104 | E | 11/1995 | Murakami | 370/535 |
| 5,521,921 | A | 5/1996 | Murai | 370/471 |
| 5,541,919 | A | 7/1996 | Yong | 370/471 |
| 6,085,252 | A * | 7/2000 | Zhu et al. | 709/231 |

(Continued)

FOREIGN PATENT DOCUMENTS

EP  0 377 203 A1  7/1990

(Continued)

OTHER PUBLICATIONS

Recommendation H.223, ITU-T, Multiplexing Protocol for low bit rate multimedia communication (Mar. 1996).

(Continued)

*Primary Examiner*—Derrick W. Ferris
(74) *Attorney, Agent, or Firm*—Sughrue Mion, PLLC

(57) ABSTRACT

A multiplexing method for multimedia communication is provided, which is compatible with the H.223 protocol by changing a header of a multiplex protocol data unit (MUX-PDU). The multiplexing method includes the steps of encoding media data, and multiplexing the media data encoded in the step (a) in units of a predetermined frame, and inserting a second flag having a predetermined length with an auto-correlation into the frame after a first flag representing the opening and closing of the frame. Therefore, the probability of detecting the MUX-PDU by a receiver is increased by adding a flag having a high auto-correlation to the H. 223 MUX-PDU frame, thereby increasing error-resiliency.

10 Claims, 2 Drawing Sheets

U.S. PATENT DOCUMENTS

| | | | |
|---|---|---|---|
| 6,104,726 A * | 8/2000 | Yip et al. ................... 370/468 |
| 6,111,916 A * | 8/2000 | Talluri et al. .......... 375/240.23 |
| 6,128,313 A * | 10/2000 | Chapman et al. ........... 370/465 |
| 6,246,490 B1 * | 6/2001 | Sebestyen ................... 358/425 |
| 6,266,349 B1 * | 7/2001 | Fukui et al. ................ 370/515 |
| 6,310,897 B1 * | 10/2001 | Watanabe et al. ........... 370/522 |
| 6,404,776 B1 * | 6/2002 | Voois et al. ................ 370/468 |
| 6,594,790 B1 * | 7/2003 | Sato et al. ................ 714/746 |
| 6,661,807 B1 * | 12/2003 | Park et al. ................. 370/469 |

FOREIGN PATENT DOCUMENTS

| | | |
|---|---|---|
| EP | 0 544 963 A1 | 6/1993 |
| JP | 7-10075 | 2/1995 |
| JP | 7-10075 B2 | 2/1995 |
| JP | 7-250127 | 9/1995 |
| JP | 8-237173 | 9/1996 |
| JP | 2636534 | 4/1997 |
| JP | 2636534 B2 | 4/1997 |
| JP | 9-162846 | 6/1997 |
| JP | 9-162846 A | 6/1997 |
| JP | 9-214479 | 8/1997 |
| JP | 10-178406 | 6/1998 |
| JP | 11-145940 | 5/1999 |
| JP | 2000-4184 | 1/2000 |
| JP | 2000-78234 | 3/2000 |
| JP | 2000-224224 | 8/2000 |

OTHER PUBLICATIONS

Spanish Search Report dated Mar. 2, 2001.
European Patent Office communication for Application No. 98 921 910.0-2223 dated Jul. 21, 2005.
Definition of "Autocorrelation" retrieved from http://en.wikipedia.org on Jul. 13, 2005.
"Fernwirktechnik in der Raumfahrt", Philipp Hartl, Springer Verlag, Berlin Heidelberg, 1988, ISBN 3-540-18851-7, 2$^{nd}$ edition.

* cited by examiner

MULTIMEDIA MULTIPLEXING METHOD

This is a continuation of U.S. application Ser. No. 08/884,630 (Confirmation No. Not Assigned) filed Jun. 27, 1997, the disclosure of which is incorporated herein by reference.

BACKGROUND OF THE INVENTION

The present invention relates to a multiplexing method for multimedia communication, and more particularly, to a multiplexing method compatible with the H.223 protocol by changing a header of a multiplex-protocol data unit (MUX-PDU).

In general, H.324 recommendation prescribes a multiplexing of video and audio signals which is effective in an error-prone channel such as a wireless channel, and includes H.223 multiplexing, H.245 controlling, H.263 video CODEC and G.723.1 audio CODEC. Also H.223 multiplexing is recommended as a method for multiplexing video, audio and other data in protocol data units (PDU) in order to realize a video telephone and video conferencing in a total digital telecommunication network by the ITU-T (the telecommunication standardization sector of the International Telecommunication Union). Also, the H.324 recommendation includes Mode 1 having high complexity and Mode 3 without having complexity. According to Mode 1, while generating a variable length packet an unequal error protection (IJEP) is performed by adopting a rate compatible punctured convolutional (RCPC) encoder/decoder (CODEC) in an adaptation layer which is an upper layer. Also, an automatic request for retransmission (ARQ) is used to maintain overall quality of service (QOS) even though the channel throughput decreases. However, the Mode 1 has a high complexity at a portion of RCPC CODEC, which increases the complexity of the overall system. Thus, it is difficult to implement a real-time process. Also, the total channel throughput of the system may decrease rapidly since it adopts a retransmission method. For example, the channel throughput is 50% or less when the retransmission is performed one time, and 33% or less when the retransmission is performed twice. Thus, it is difficult in Mode 1 of H.324 to implement transcoding having compatibility with the conventional H.223. Furthermore, Mode 3 has virtually no error-protection concept, so that error-resiliency in an error-prone channel is very low.

SUMMARY OF THE INVENTION

It is an object of the present invention to provide a multiplexing method for multimedia communication, enabling transcoding with H.223 protocol by adding a flag which is similar to a pseudo noise code (PN CODE), after a high-level data link control (HDLC) flag in the multiplex-protocol data unit (MUX-PDU) by H.223 protocol.

To achieve the object, there is provided a multiplexing method for multimedia communication in H.223 protocol, comprising the steps of: (a) encoding media data; and (b) multiplexing the media data encoded in the step (a) in units of a predetermined frame, and inserting a second flag having a predetermined length with an auto-correlation in the frame after a first flag having the opening and closing of the frame.

Preferably, the second flag of the step (b) has a bit pattern of "10110010".

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
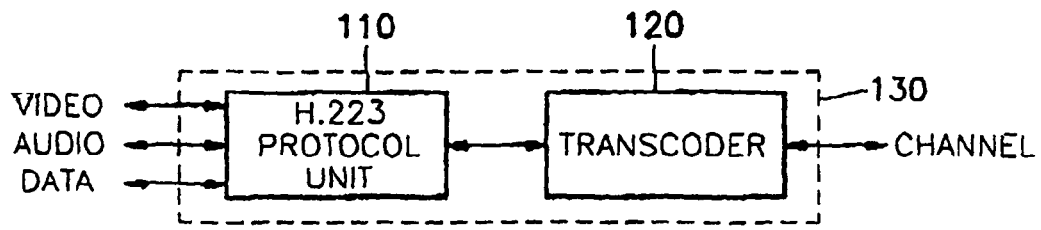
FIG. 1 is a schematic block diagram of a device for implementing a multiplexing method for multimedia communication, compatible with H.223 protocol, according to the present invention.

In FIG. 1 showing a device for implementing an H.223 multiplexing method for multimedia communication according to the present invention, a multiplexing portion 130 includes an H.223 protocol unit 110 and a transcoder 120. The H.223 protocol unit 110 and the transcoder 120 perform multiplexing with respect to encoded media data (video, audio and other data), passing the encoding media data through protocol data units (not shown) to transmit to a channel.

FIG. 2 is a diagram showing the structure of a general H.223 MUX-PUD frame.

Figure 2A:
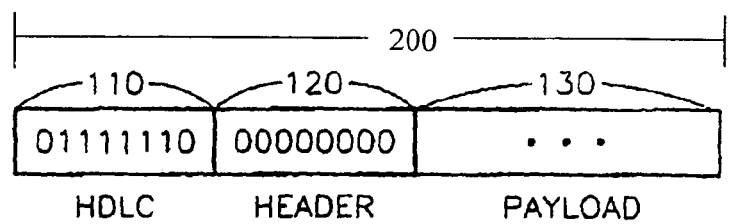
FIG. 2A is a diagram showing the structure of a general H.223 MUX-PDU frame.

As shown in FIG. 2A, the H.223 MUX-PDU is constituted by units of a frame 200, and the frame includes a high-level data link control (HDLC) flag 110 for transmission control, a header 120 including data information, and a payload 130 including video and audio data.

All MUX-PDU of the H.223 are defined using the HDLC flag 110 of FIG. 2A. The HDLC flag 110 has an unique bit pattern "101111110" having six continuous "1s" representing the opening or closing of the frame, and is used for synchronization of the frame.

Figure 2B:
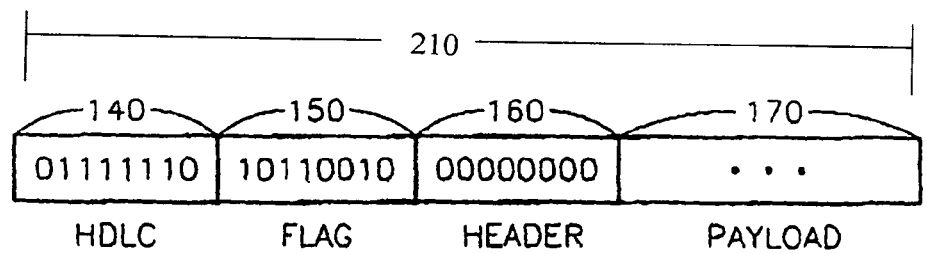
FIG. 2B is a diagram showing the structure of an H.223 MUX-PDU frame according to the present invention.
Figure 3A:
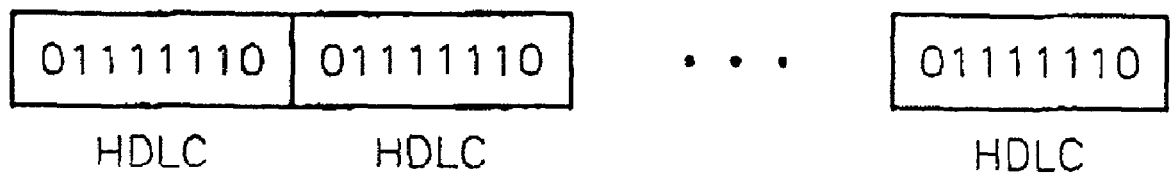
FIG. 3A is a diagram showing the structure of the H.223 MUX-PDU frame in a filling mode.
Figure 3B:
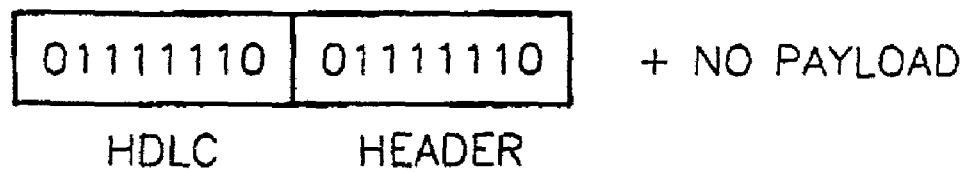
FIG. 3B is a diagram showing the structure of the H.223 MUX-PDU frame in an abort message mode.

FIG. 2B is a diagram showing the structure of an H.223 MUX-PDU frame 210 according to the present invention. The MUX-PUD frame 210 includes an HDLC flag 140, an extra flag 150, a header 160 and a payload 170. The transcoder 120 inserts an 8-bit extra flag 150, which is similar to a pseudo noise code (PN CODE), having a high auto-correlation next to the HDLC flag 150 as shown in FIG. 2B. Here, the reason for selecting the extra flag having a bit pattern of "10110010" is its high auto-correlation similar to the PN code. Thus, only the bit pattern of "10110010" may be added as the extra flag 150, or other bit streams having a high auto-correlation may be used thereas to increase error-resiliency. Also, a longer flag may be added in consideration of a trade-off with a channel band width. Preferably, adding the extra flag, as suggested by the present invention, is prevented by a filling mode in which HDLC flags exist continuously as shown in FIG. 3A or an abort message mode without a payload as shown in FIG. 3B.

Figure 2C:
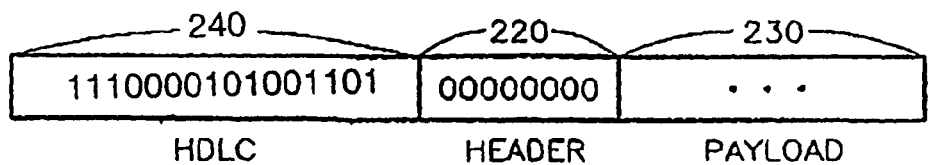
FIG. 2C is a diagram showing the structure of an H.223 MUX-PDU frame according to a second embodiment of the invention.

FIG. 2C is a diagram showing the structure of a MUX-PDU frame of the H.223 protocol according to the present invention. The MUX-PDU frame of the H.233 protocol includes an HDLC flag 240, a header 220, and a payload 230. The HDLC flag 240 converts an 8-bit flag into a 16-bit flag PN code having autocorrelation in order to maintain compatibility with the H.223 protocol. The PN code is "1110 0001 0100 1101". The multiplexing method for multimedia communication according to the present invention is not limited to the particular forms illustrated and further modifications will occur to those skilled in the art. For example, interleaving and RCPC processes may be performed by using each extra flag of a plurality of MUX-PDUs.

As described above, in the multiplexing method for multimedia communication according to the present invention, MUX-PDU including an extra flag having a high auto-correlation is transmitted using H.223 protocol, increasing the probability of detecting the MUX-PDU by a receiver. Thus, error-resiliency is increased. Furthermore, when the multiplexing method is used together with the RCPC and interleaving methods, error-resiliency can be further increased.

What is claimed is:

1. A multiplexing method for multimedia communication, comprising the steps of:
   (a) encoding media data; and
   (b) multiplexing the media data encoded in the step (a) in units of a predetermined frame, and inserting a second flag having a predetermined length with an auto-correlation in the frame after a first flag having the opening and closing of the frame.

2. The multiplexing method of claim 1, wherein the frame further comprises: a header having data information: and a payload having video and audio data.

3. The multiplexing method of claim 1, wherein the second flag of the step (b) has a bit pattern of "10110010".

4. The multiplexing method of claim 1, wherein the second flag of the step (b) is a pseudo noise code (PN CODE).

5. The multiplexing method of claim 1, wherein the multiplexing of the step (b) is performed together with interleaving.

6. The multiplexing method of claim 1, wherein the second flag is inserted in the frame when a plurality of the first flags exist continuously or no payload exists in the frame.

7. The multiplexing method of claim 1, wherein the second flag has a predetermined length with a high auto-correlation in the frame.

8. A multiplexing method for multimedia communication, comprising the steps of:
   (a) encoding media data; and
   (b) multiplexing the media data encoded in the step (a) in units of a predetermined frame, and converting an 8-bit sync code forming a flag indicating opening or closing of the frame into a 16-bit pseudo noise sync code.

9. The multiplexing method of claim 8, wherein the 16-bit pseudo noise code in said step (b) has a pattern of "1110 0001 0100 1101".

10. The multiplexing method of claim 8, wherein the 16-bit pseudo noise sync code has a high autocorrelation in the frame.

* * * * *